March 21, 1933.  G. W. TALBOT  1,902,196

VEGETABLE AND FRUIT SHIPPING BASKET

Filed Sept. 19, 1931

Inventor,
George W. Talbot
By Minturn & Minturn
Attorneys.

Patented Mar. 21, 1933

1,902,196

UNITED STATES PATENT OFFICE

GEORGE W. TALBOT, OF BLOOMINGTON, INDIANA

VEGETABLE AND FRUIT SHIPPING BASKET

Application filed September 19, 1931. Serial No. 563,816.

This invention relates to the marketing of ripe tomatoes, peaches, and other comparatively soft-skinned vegetables and fruits in baskets which are provided with handles for convenient handling and carrying.

Baskets for the above uses as heretofore made were comprised of interwoven vertical and horizontal veneer strips, reenforced at the rim by horizontal inside and outside strips, between which the ends of the vertical strips were assembled and retained by staples. The handle was of veneer strips bent U-shape and having the stems inserted between the two strips of the rim and carried down inside of the middle vertical strip or stave to the bottom of the basket. The handle was retained by a rivet on each side of the basket through the rim strips and handle and by a lower rivet through the stave and handle-stem to keep the handle vertical. These lower rivets were often improperly clinched resulting in inwardly projecting points which punctured the commodity.

In addition, the ends of the handles, due to warping or other causes, frequently projected in a manner to abrade and to frequently puncture the skin of the vegetable or fruit content of the basket, particularly in shipping.

The object of this invention is to avoid the use of the lower staples and also to cover the ends of the handles that they will not come into contact with the commodity of the basket.

I accomplish these and other objects by the means illustrated in the accompanying drawing, in which—

Like characters of reference indicate like parts in the two views.

Figure 1:
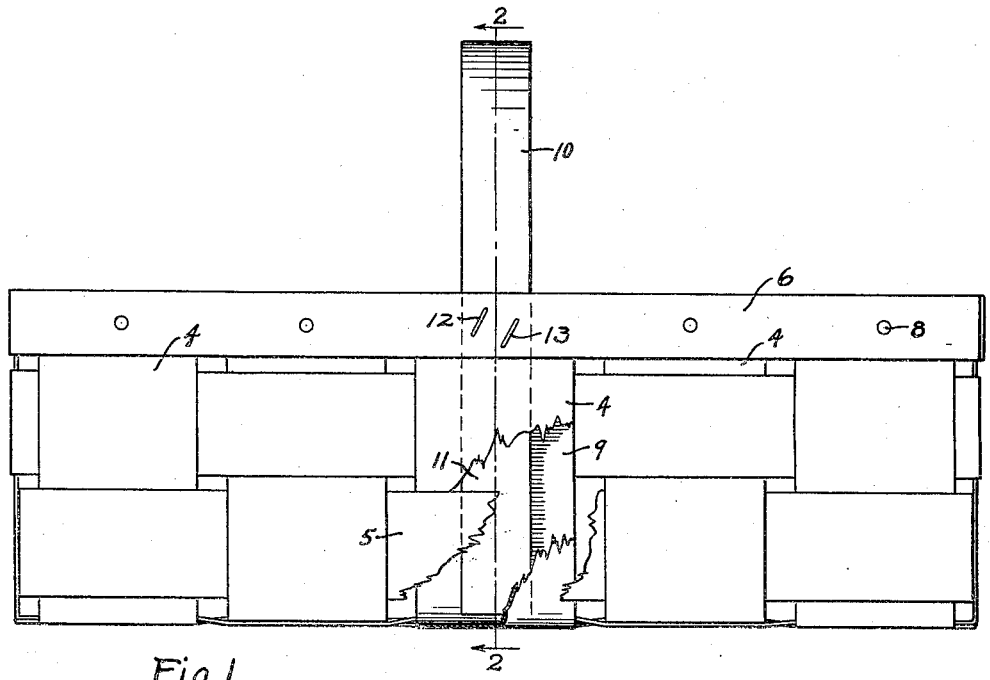
Fig. 1 is a view in side elevation of a basket embodying my invention, broken away in part on the near side to show the near handle-stem and the inner protecting stave.
Figure 2:
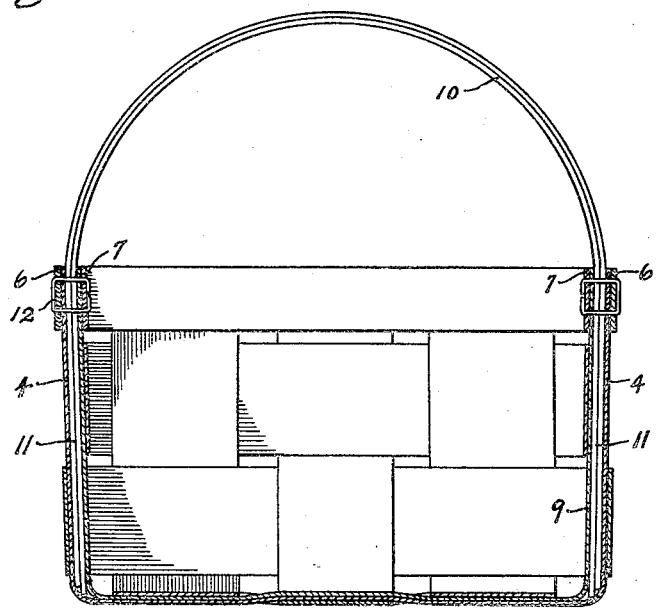
Fig. 2 is a vertical section on the line 2—2 of Fig. 1.

The body of the basket is formed out of a series of veneer strips each comprising a horizontal member 3 and integral ends bent upward at approximately right angles to form vertical staves 4, 4. These are assembled for both sides and both ends and are interwoven to form the basket bottom in the usual manner.

Horizontal filling strips 5 are interwoven with the staves and extend continuously around the basket.

The upper ends of the staves are joined together and are reenforced by an outside veneer rim band 6 and an inside veneer rim band 7, and the assembly is retained by tacks 8, or staples, also in the usual manner.

Midway between the ends of the basket a second or inside stave 9, similar in all respects to the middle stave 4, is assembled parallel and in contact with the middle stave 4, thereby forming a double middle stave.

A handle 10 is here shown as formed out of two veneer strips contacting each other, and bent U-shape. The resulting two stems 11, 11, are respectively introduced between the double middle staves on each side of the basket, and are forced down until the ends of the stems 11 contact the bottom of the basket where it bends to form the staves. The insertion is so tight a fit that the ends of the handle are held against edgewise movement, and this is further insured by driving two horizontally spaced apart staples 12 and 13 through the rim members, double stave and handle, and clenching the staples against the inside of the rim.

By the above construction the requirement of a lower staple is obviated, the handle is held from tilting by the staples 12 and 13 and friction of the handle ends between the members of the double stave, and the commodity in the basket is protected from the handle-ends by the inside staves 9, which prevent all contact with the handle ends.

Having thus fully described my invention, what I claim as new and wish to secure by Letters Patent of the United States is—

1. A basket formed of veneer strips some of which comprise a bottom member and integral ends upturned to form staves, the middle stave on two opposite sides of the basket being double and interwoven with horizontal strips, a pair of rim strips one on each side of the staves, a handle having its ends inserted between the two members of the rim and frictionally gripped between the double staves and a plurality of staples on each side of the basket substantially spaced from each other uniting the assembly at the rim whereby the handle is prevented from tilting.

2. A basket formed of veneer strips some of which comprise a bottom member and integral ends upturned to form staves, the middle stave on two opposite sides of the basket being double and interwoven with horizontal strips, a pair of rim strips one on each side of the staves, a handle having its ends inserted between the two members of the rim and frictionally gripped between the double staves and contacting the bottom of the basket and a plurality of staples on each side of the basket substantially spaced from each other uniting the assembly at the rim whereby the handle is prevented from tilting.

In testimony whereof I affix my signature.

GEORGE W. TALBOT.